J. BRANDSTETTER.
SPEED INDICATOR.
APPLICATION FILED MAR. 8, 1920.
1,354,278.
Patented Sept. 28, 1920.
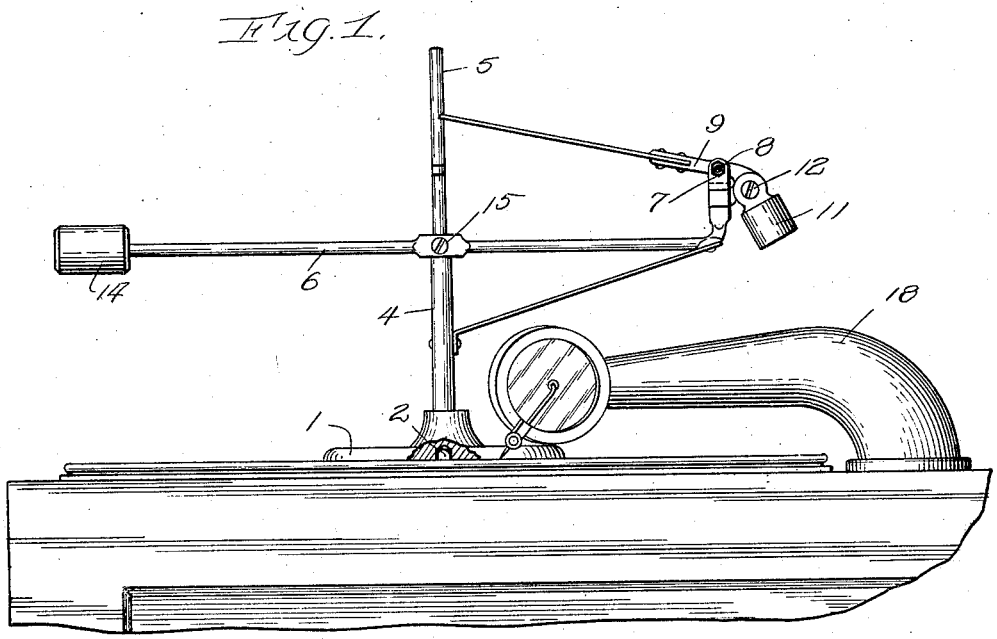
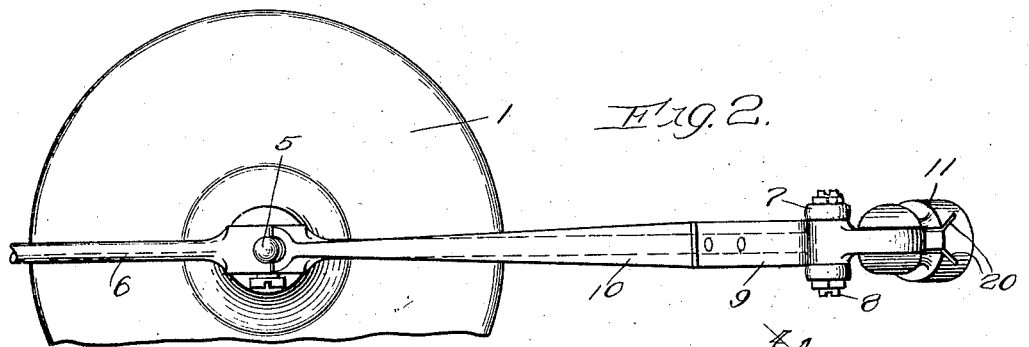
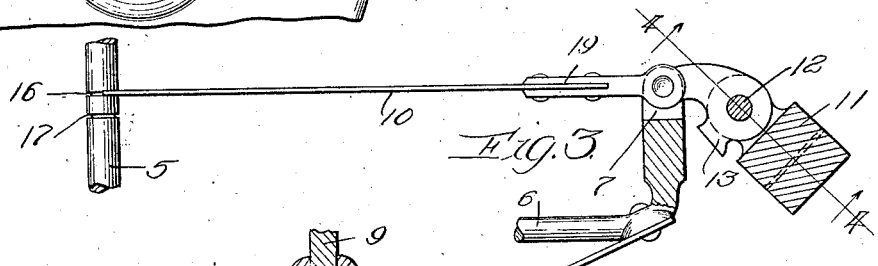
Inventor:
Josef Brandstetter
by Albert Scheibl
Attorney
Witness:
R. L. Farrington

UNITED STATES PATENT OFFICE.

JOSEF BRANDSTETTER, OF CHICAGO, ILLINOIS, ASSIGNOR TO ACME ENGINEERING & MFG. CO., OF CHICAGO, ILLINOIS, A CORPORATION OF DELAWARE.

SPEED-INDICATOR.

1,354,278.	Specification of Letters Patent.	Patented Sept. 28, 1920.

Application filed March 8, 1920. Serial No. 364,205.

*To all whom it may concern:*

Be it known that I, JOSEF BRANDSTETTER, citizen of the United States, residing at Chicago, in the county of Cook and State of Illinois, have invented certain new and useful Improvements in Speed-Indicators; and I do hereby declare the following to be a full, clear, and exact description of the invention, such as will enable others skilled in the art to which it appertains to make and use the same.

My invention relates to speed indicators and more particularly to the class of indicators adapted to show when one or another of certain predetermined speeds has been reached, its general objects being to provide an unusually simple, and accurate instrument for such purposes and one which can easily be read from a number of different directions. More particularly, my invention relates to an indicator adapted to show whether or not the spindle of a phonograph is rotating at the speed for which the records were designed. Indicators as heretofore offered for this purpose have been unsatisfactory, partly owing to a lack of accuracy, partly because of the difficulty in properly adjusting them at the factory, partly because they could not easily be read from convenient positions when in operation, and partly because they were not equally suitable for use with phonographs designed for operation at different speeds. Moreover, such speed indicators as heretofore used with phonographs have interfered with the movement of the tone arm and reproducer to their normal operative positions, so that the testing of the speed had to be done when the mechanism was not subjected to the added resistance due to the drag of the needle on the record, and the speed shown by the indicator was therefore no criterion of the speed of the phonograph when playing a record. To overcome this further objection, my invention also aims to provide an indicator which may readily be employed while the phonograph is actually playing a record and is therefore operating under exactly normal conditions. Moreover, my invention aims to provide an indicator of this class which can be instantly attached to or detached from, a standard type of phonograph without the use of tools, and to provide suitable balancing means for stabilizing the indicator. Still further and also more detailed objects will appear from the following specification and from the accompanying drawings, in which—

Figure 1 is an elevation of a speed indicator embodying my invention, with a part of the base broken away to show the engagement of the base with the spindle of a phonograph, and showing indicator as it appears in use with the phonograph playing a record.

Fig. 2 is a fragmentary plan view of the same.

Fig. 3 is an enlarged side elevation of the indicating arm and of parts associated therewith, with part of the weight and the pivot arm in section.

Fig. 4 is an enlarged section through the weight on the pivoted arm, taken along the correspondingly numbered line of Fig. 3.

In the embodiment of the drawings, the indicator of my invention includes a base 1 adapted to be set either directly on the rotating table of a phonograph or on the central portion of a record on such a table, and having a vertical bore adapted to fit slidably over the spindle 2 of the phonograph. Fast upon the base and in axial alinement with the said bore and spindle is a stem 4, which stem desirably has its upper portion 5 reduced in diameter so as to afford a shoulder for supporting a cross bar 6. The cross bar 6 extends at right angles to the shaft 4 and desirably has one end formed into an upwardly directed fork 7 carrying pointed screws 8 affording anti-friction bearings for a lever 9. This lever desirably has a transverse slot 19 in the end directed toward the spindle or reduced stem portion 5 of the indicator for receiving the outer end of a blade of steel 10 which forms the movable indicating portion of my appliance. This pointer 10 desirably has its free end formed into a fork loosely straddling the spindle 5 so as to reach substantially half way around this spindle when the indicator is in normal use, after the manner shown in Fig. 2.

The other end of the lever carries a weight 11 which makes this end overbalance the combined weight of the inwardly directed arm of the lever and of the said steel indicating blade. This weight 11 is desirably connected to the lever through a pivot screw 12, so that the weight can be adjusted in position about this pivot to vary the effective length of the outer arm of the lever. To permit of firmly clamping the weight in any desired position and to avoid a loosening of the same when the indicator is being handled, I desirably make a couple of oblique saw cuts 20 as extensions of the slot in the weight, as shown in Fig. 4, so that the portions of the weight which straddle the outer end of the lever can be sprung inwardly when they are being clamped against the lever, and so that the tendency of these parts to spring apart will lock the pivot screw against loosening. I also desirably provide the upper end of the lever with a lug 13 adapted to engage the upwardly directed arm on the cross bar, as shown in Fig. 1, so as to limit the upward swinging of the indicating pointer when the indicator is at rest. Then I desirably provide the other end of the cross bar with a weight 14 approximately balancing the combined weights of the lever and the weight, so that the appliance as a whole will be substantially balanced about the axis of its stem and spindle. Likewise, I secure the cross bar against rotation on the said stem by any suitable means, such as a screw 15.

With the indicator in position as shown in Fig. 1, the friction between the base of the appliance and the phonograph portion on which the latter is placed will cause the indicator to rotate with the spindle of the phonograph, this friction being desirably increased by a layer of felt on the bottom of the base 1, which felt is not shown in the drawings. As the indicator revolves, the effect of centrifugal force on the weight 11 (which normally depends obliquely downward from the pivot screws 8) will swing this weight outwardly or away from the axis of the indicator, thus causing the weight to rock the indicating lever and to move the indicating arm downward. Consequently, the position of the fork on this arm longitudinally of the spindle 5 will depend on the speed at which the appliance is rotating, so that this speed can be read from any suitable marking on the spindle 5. For example, if the stem 5 has a groove 16, so disposed as to be exactly opposite the forked end of the indicating arm when the turntable of the phonograph is read at a speed of 78 revolutions per minute, a glance at the appliance will show whether or not the motor is revolving the turntable at exactly this speed, as the forked end of the indicating arm will then aline with this groove 16, but will be above this groove if the speed is lower and below this groove if the speed is higher. Likewise, I may equip the stem 5 with a second groove 17 disposed in line with the indicating arm at a speed of 80 revolutions per minute as used on certain other phonographs. In either case, since the grooves 16 and 17 extend entirely around the same, and since the forked end of the indicating arm extends half way around the latter, the reading may easily be had from a variety of positions, since the fork when rotating gives the appearance of a flat ring, which ring shifts vertically as the speed varies and which ring appears to be in the same plane with one of the grooves when the speed of rotation is that corresponding to the predetermined location of this groove.

By using an inserted extension of the lever as the indicating portion of the latter, I can keep down the weight of this arm while giving it such length as to afford a considerable movement with a relatively small variation in speed, and can therefore easily secure the desired accuracy. Likewise, by using tempered steel for this portion I can prevent it from being bent out of shape even when the device is subjected to rough handling. Likewise, while the adjustable mounting of the weight is intended primarily for the initial adjustment at the factory, this can also be used for making any needed readjustment, in case the appliance should be damaged in any way.

To facilitate the use of my appliance, I desirably make the spindle or stem 5 so long as to extend for some distance above the uppermost position of the forked end of the indicating arm, so that this projecting tip of the stem can be manually grasped for placing my speed indicator in position, or for taking the same off the phonograph, even while the latter is in operation. Moreover, by suitably spacing the cross bar 6 from the base, I permit both this cross bar and the weighted end of the lever to swing above the tone arm 18 of the phonograph, so that I am able to make the desired speed test under the actual operating conditions of a phonograph, namely with the latter actually playing a record and hence subjected to the drag of the needle on the record.

However, while I have pictured and described the indicator of my invention in a desirable embodiment including a lever having a thin steel blade as its indicating portion and including a highly desirable mounting for the weight on the lever, I do not wish to be limited to these or other details of the construction and arrangement thus disclosed. Obviously, various changes, additions and omissions might be made without departing from the spirit of my invention or from the appended claims.

I claim as my invention:

1. In a speed indicator for phonographs, a base equipped with means for engaging the spindle of the phonograph table, a stem carried by the base in alinement with the spindle, a transverse arm fast on the stem, and a weighted lever pivoted on the free end of the arm, the stem having a peripheral groove and the lever having a forked end straddling the stem and adapted to aline with the groove in the stem when the lever is swung to a predetermined position by centrifugal action on the weighted portion thereof.

2. In a speed indicator for phonographs, a base equipped for engagement with the spindle of the phonograph, a stem carried by the base in alinement with the spindle and having a peripheral groove, a transverse pivot arm fast on the stem at such a height above the base as to clear the tone arm of the phonograph when the base is set upon a playing record, and a centrifugally movable lever pivoted on the said arm and having an indicating portion directed toward the said stem and adapted to aline with the said groove when the stem is rotating at a predetermined speed, and a balancing weight at the opposite end of the arm from that on which the lever is pivoted.

3. In a speed indicator for phonographs, a supporting member adapted to seat upon the playing record and equipped for engaging the spindle of the phonograph, and a centrifugally movable arm pivoted to the supporting member on an axis spaced from the axis of the spindle and above the path of the tone arm of the phonograph, the supporting member including an indicating stem alining with the said spindle, the said stem having a lateral formation coöperating with the movable arm in showing when the record is rotating at a predetermined speed.

4. In a speed indicator of the class described, a stem equipped with a lateral indicating formation, means for maintaining the stem axial of the object whose speed is to be indicated, a supporting element fast with respect to the stem, and a centrifugally actuated lever pivoted on the supporting element at a distance from the stem and presenting one end adjacent to the stem, the said end of the lever having a flat arcuate tip adapted to be concentric of the stem and in the same plane with the said formation on the stem when the indicator is rotating at a predetermined speed, the arcuate extension of the said tip being such that the same will simulate a flat ring visible from any direction above the indicator, whereby the speed indication can readily be judged from the position of the plane of the simulated ring with respect to the said formation on the stem.

5. A speed indicator for phonographs including a support engaging the spindle of the phonograph and having a stem alining with said spindle and a bearing portion disposed above and laterally of the spindle, an indicating lever pivoted on the said bearing portion and having its inner arm extending toward the stem, and a weight having a forked end straddling the outer arm of the lever and pivoted to the said outer arm; the weight having slots in continuation of the gap of its fork, thereby permitting the fork to be sprung inwardly to clamp the same securely to the outer arm of the lever.

Signed at Chicago, Illinois, March 4th, 1920.

JOSEF BRANDSTETTER.